(12) United States Patent
Stranberg et al.

(10) Patent No.: US 11,904,534 B2
(45) Date of Patent: Feb. 20, 2024

(54) ADDITIVE MANUFACTURING SYSTEM

(71) Applicant: Continuous Composites Inc., Coeur d'Alene, ID (US)

(72) Inventors: Nathan Andrew Stranberg, Post Falls, ID (US); Andrew Michael Stulc, Spokane, WA (US); Brock Adam Jahner, Coeur d'Alene, ID (US); Stephen Tyler Wilson, Coeur D'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 229 days.

(21) Appl. No.: 17/249,225

(22) Filed: Feb. 24, 2021

(65) Prior Publication Data

US 2021/0260821 A1 Aug. 26, 2021

Related U.S. Application Data

(60) Provisional application No. 63/027,188, filed on May 19, 2020, provisional application No. 62/981,515, filed on Feb. 25, 2020.

(51) Int. Cl.
*B29C 64/165* (2017.01)
*B29C 64/255* (2017.01)
(Continued)

(52) U.S. Cl.
CPC .......... *B29C 64/165* (2017.08); *B29B 15/122* (2013.01); *B29C 64/194* (2017.08);
(Continued)

(58) Field of Classification Search
CPC ... B29C 64/165; B29C 64/194; B29C 64/209; B29C 64/255; B29C 64/264;
(Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
DE 102013111100 A1 4/2015
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — S. Behrooz Ghorishi
(74) *Attorney, Agent, or Firm* — Ryan Stockett

(57) ABSTRACT

An additive manufacturing system is disclosed for use in fabricating a structure. The additive manufacturing system may include a support, and a print head operatively connected to and moveable by the support. The print head may include a housing, a supply module operatively mounted to the housing and configured to hold a supply of continuous reinforcement, an impregnation module operatively mounted to the housing and configured to wet the continuous reinforcement with a matrix, and a clamping module operatively mounted to the housing downstream of the supply module relative to movement of a reinforcement through the print head. The clamping module may be configured to selectively clamp the continuous reinforcement. The additive manufacturing system may also include a controller in communication with the support and the print head and configured to coordinate operations of the support and the print head to fabricate a three-dimensional structure.

16 Claims, 13 Drawing Sheets

(51) Int. Cl.

| | |
|---|---|
| *B29C 64/194* | (2017.01) |
| *B29C 64/264* | (2017.01) |
| *B29C 64/336* | (2017.01) |
| *B29B 15/12* | (2006.01) |
| *B29C 70/06* | (2006.01) |
| *B29C 70/38* | (2006.01) |
| *B29C 64/393* | (2017.01) |
| *B29C 64/209* | (2017.01) |
| *B33Y 70/10* | (2020.01) |
| *B33Y 10/00* | (2015.01) |
| *B33Y 30/00* | (2015.01) |
| *B33Y 40/20* | (2020.01) |
| *B33Y 40/10* | (2020.01) |
| *B33Y 50/02* | (2015.01) |

(52) U.S. Cl.
CPC .......... *B29C 64/209* (2017.08); *B29C 64/255* (2017.08); *B29C 64/264* (2017.08); *B29C 64/336* (2017.08); *B29C 64/393* (2017.08); *B29C 70/06* (2013.01); *B29C 70/384* (2013.01); *B33Y 10/00* (2014.12); *B33Y 30/00* (2014.12); *B33Y 40/10* (2020.01); *B33Y 40/20* (2020.01); *B33Y 50/02* (2014.12); *B33Y 70/10* (2020.01)

(58) Field of Classification Search
CPC ..... B29C 64/336; B29C 64/393; B29C 70/06; B29C 70/384; B29C 64/321; B29C 64/118; B29B 15/122; B33Y 10/00; B33Y 30/00; B33Y 40/10; B33Y 40/20; B33Y 50/02; B33Y 70/10; B33Y 70/00; B33Y 40/00; B22F 12/53; B22F 12/55; B22F 12/84; C22C 47/14; Y02P 10/25
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,511,543 B2 | 12/2016 | Tyler | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,315,355 B2 | 6/2019 | Tyler | |
| 10,315,356 B2 | 6/2019 | Tyler | |
| 10,449,711 B2 | 10/2019 | Tyler | |
| 10,603,836 B2 | 3/2020 | Tyler | |
| 10,647,058 B2 | 5/2020 | Tyler et al. | |
| 10,744,707 B2 | 8/2020 | Tyler | |
| 10,744,708 B2 | 8/2020 | Tyler | |
| 10,759,109 B2 | 9/2020 | Tyler | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1* | 1/2007 | Schroeder | B29C 70/50 425/71 |
| 2007/0228592 A1 | 10/2007 | Dunn et al. | |
| 2008/0176092 A1 | 7/2008 | Owens | |
| 2009/0095410 A1 | 4/2009 | Oldani | |
| 2010/0230043 A1* | 9/2010 | Kisch | B29C 70/545 156/256 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247651 A1* | 10/2012 | Nieuwenhove | B29C 70/384 156/356 |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2014/0328963 A1 | 11/2014 | Mark et al. | |
| 2015/0136455 A1 | 5/2015 | Fleming | |
| 2015/0217517 A1 | 8/2015 | Karpas et al. | |
| 2015/0273762 A1 | 10/2015 | Okamoto | |
| 2015/0343713 A1* | 12/2015 | Engel | B29C 70/38 156/379.8 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |

(56) References Cited

U.S. PATENT DOCUMENTS

| | | |
|---|---|---|
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0126665 A1* | 5/2018 | Tyler .................. B29C 64/227 |
| 2019/0022935 A1 | 1/2019 | Tooren et al. |
| 2019/0315057 A1 | 10/2019 | Budge et al. |
| 2019/0375154 A1 | 12/2019 | Hambling et al. |
| 2020/0324468 A1 | 10/2020 | Tyler |
| 2023/0076283 A1* | 3/2023 | Mueller .................. B29C 70/40 |

FOREIGN PATENT DOCUMENTS

| | | |
|---|---|---|
| EP | 2589481 B1 | 1/2016 |
| EP | 2433784 B1 | 6/2017 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

(56) References Cited

OTHER PUBLICATIONS

Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
International Search Report dated Jul. 6, 2021 for PCT/US2020/019533 to Continuous Composites Inc. filed on Feb. 25, 2021.

* cited by examiner

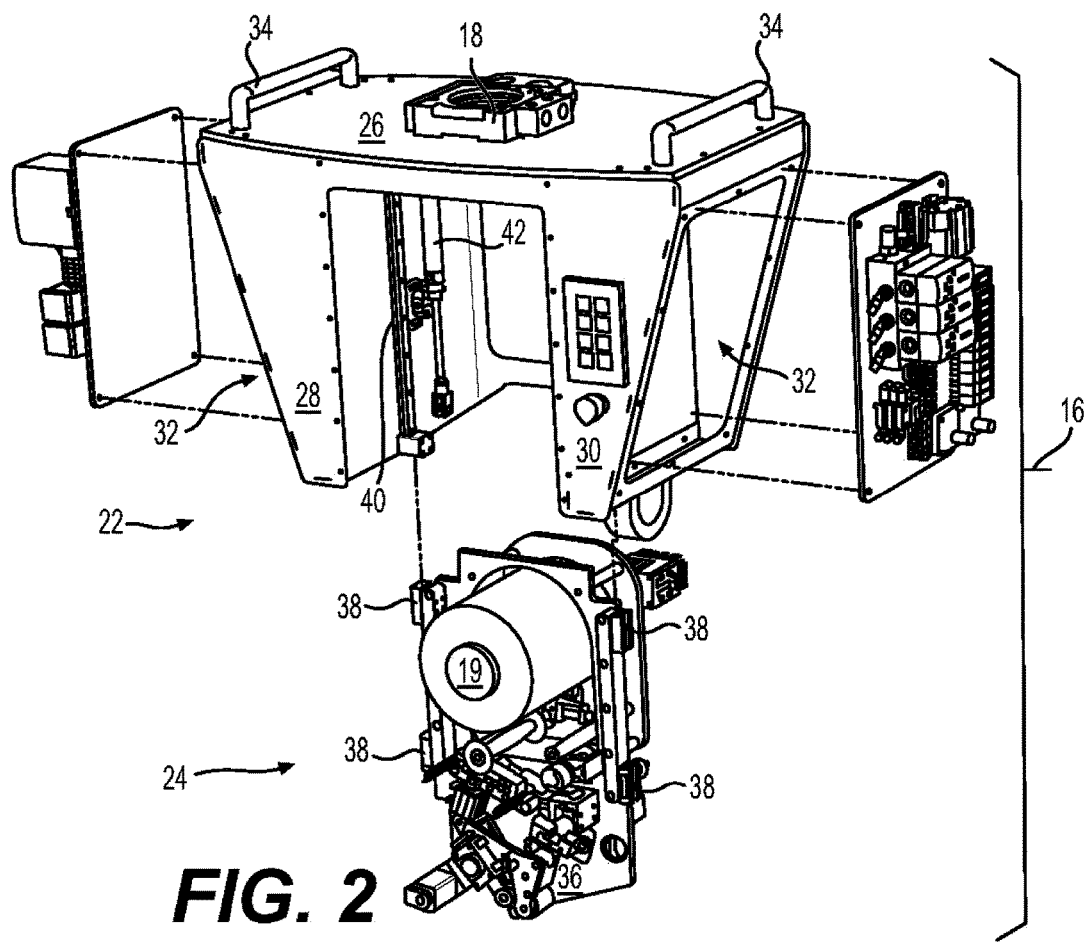
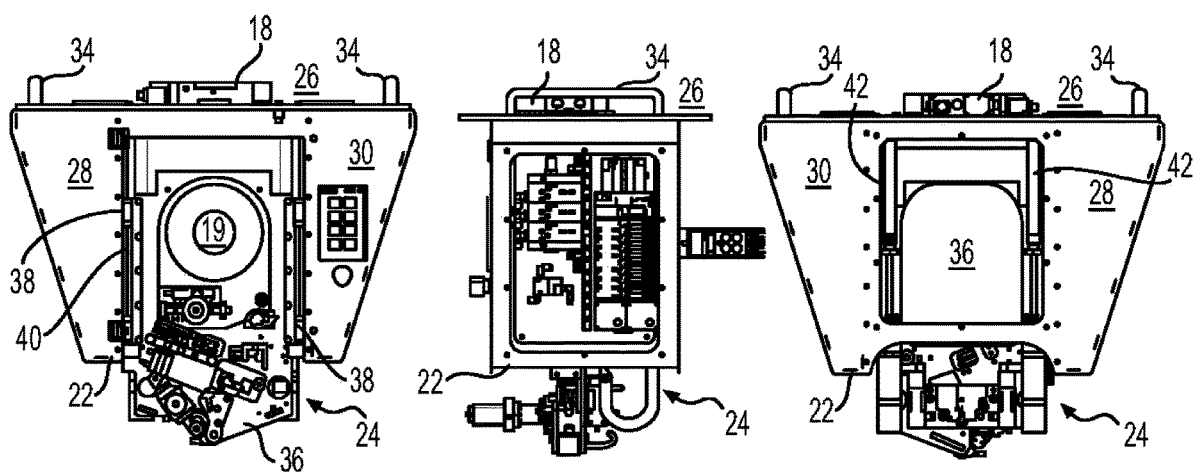
FIG. 2    FIG. 3    FIG. 4    FIG. 5

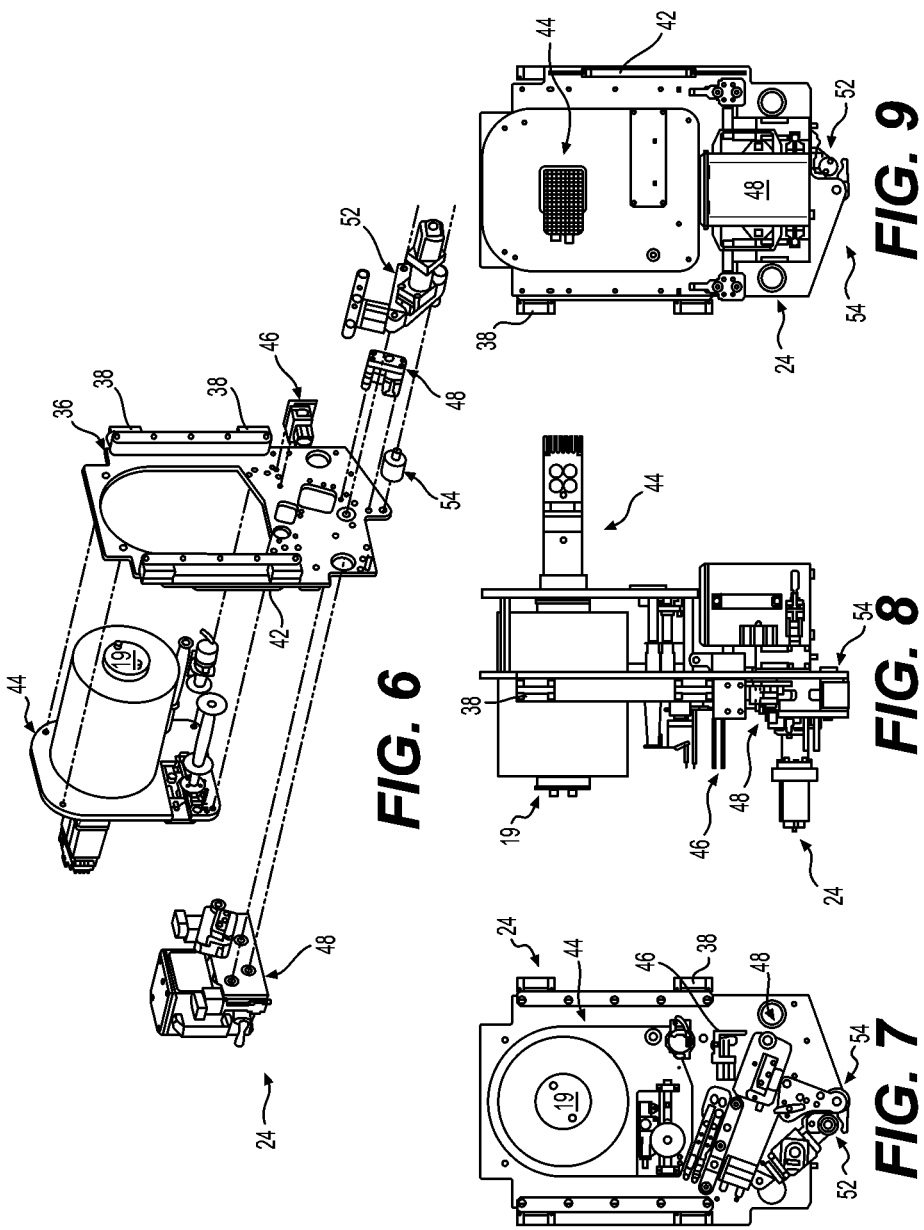

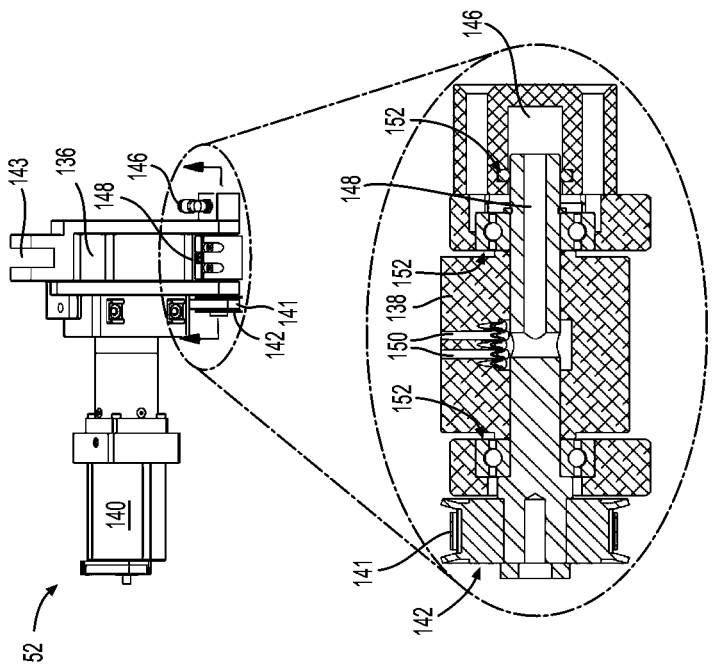
FIG. 18
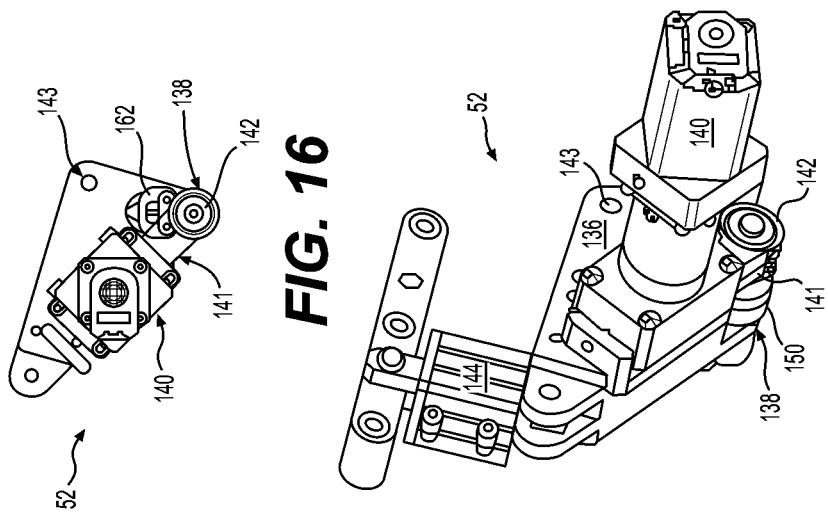
FIG. 16
FIG. 17

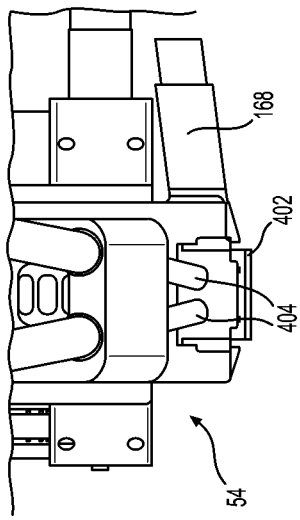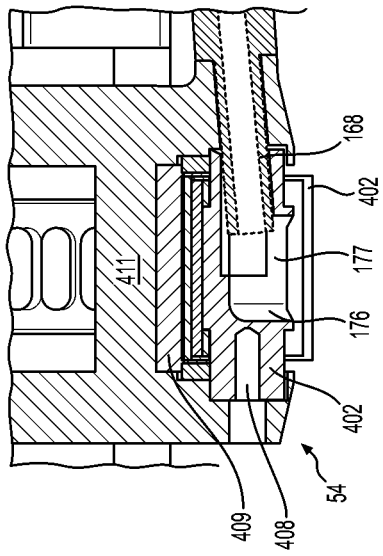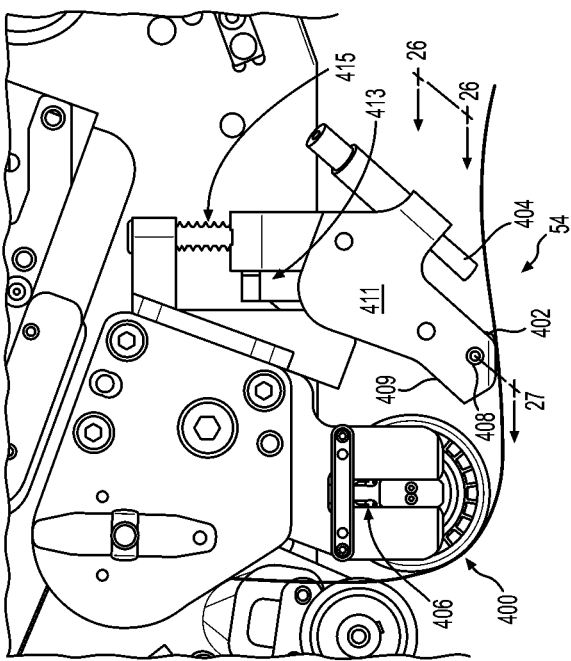

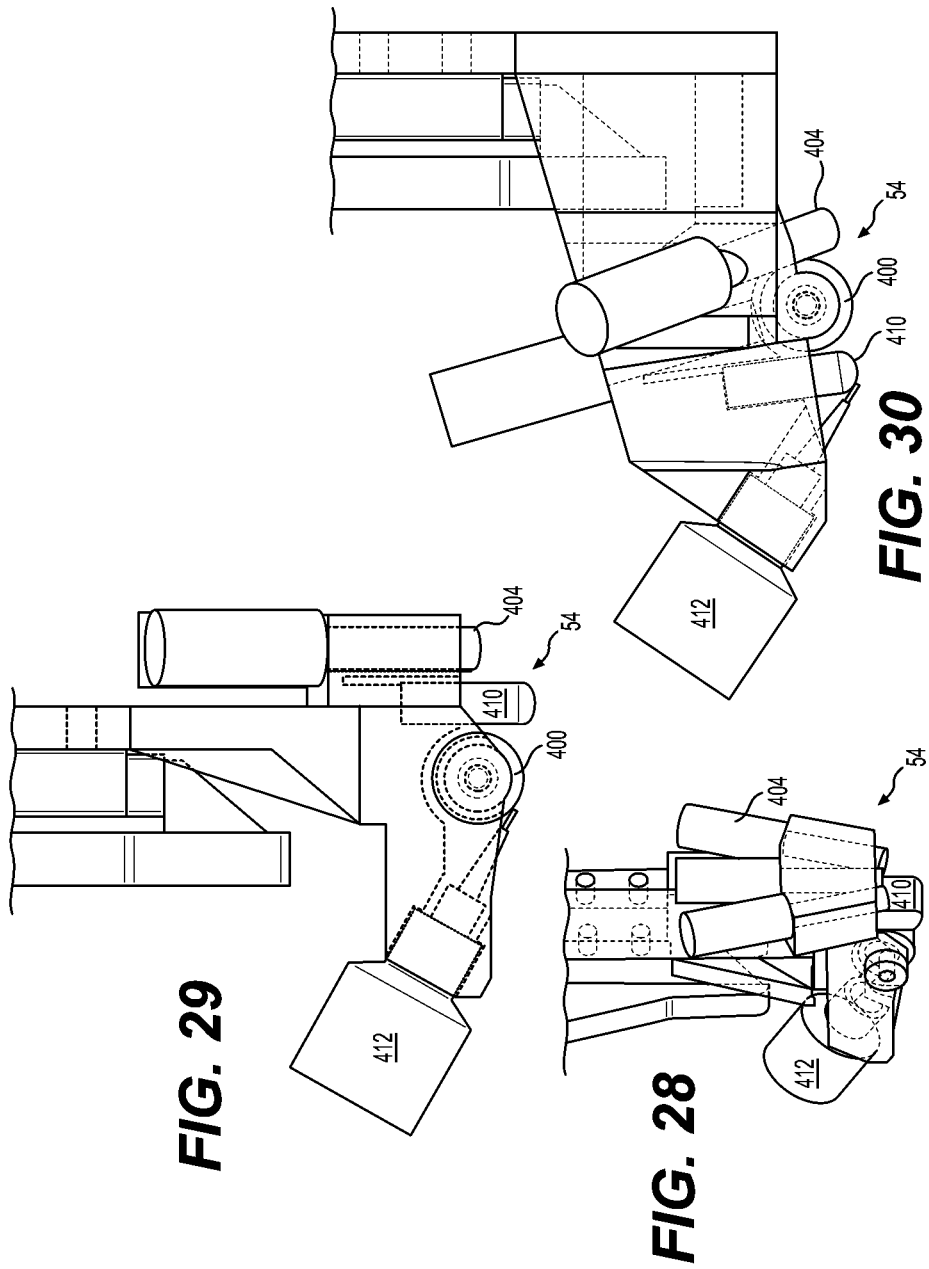

ADDITIVE MANUFACTURING SYSTEM

RELATED APPLICATION

This application is based on and claims the benefit of priority from U.S. Provisional Application No. 62/981,515 that was filed on Feb. 25, 2020 and U.S. Provisional Application No. 63/027,188 that was filed on May 19, 2020, the contents of all of which are expressly incorporated herein by reference.

TECHNICAL FIELD

The present disclosure relates generally to a manufacturing system and, more particularly, to a print head for an additive manufacturing system.

BACKGROUND

Continuous fiber 3D printing (a.k.a., CF3D®) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a liquid thermoset (e.g., an energy-curable single- or multi-part resin), another snap-curing liquid, or a combination of any of these and other known matrixes. Upon exiting the print head, a cure enhancer (e.g., a UV light, a laser, an ultrasonic emitter, a heat source, a catalyst supply, etc.) is activated to initiate, enhance, and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016.

Although CF3D® provides for increased strength, compared to manufacturing processes that do not utilize continuous fiber reinforcement, care must be taken to ensure proper wetting of the fibers with the matrix, proper cutting of the fibers, automated restarting after cutting, proper compaction of the matrix-coated fibers after discharge, and proper curing of the compacted material. An exemplary print head that provides for at least some of these functions is disclosed in U.S. Patent Application Publication 2019/0315057 that published on Oct. 17, 2019 ("the '057 publication").

While the print head of the '057 publication may be functionally adequate for many applications, it may be less than optimal. For example, the print head may lack accuracy and/or control granularity in placement, cutting, compaction, and/or curing that is required for other applications. The disclosed print head and system are directed at addressing one or more of these issues and/or other problems of the prior art.

BRIEF DESCRIPTION OF THE DRAWINGS

FIGS. 2, 3, 4 and 5 are exploded and diagrammatic illustrations of an exemplary disclosed print head that may be used in conjunction with the system of FIG. 1;

FIGS. 6, 7, 8 and 9 are exploded and diagrammatic illustrations of an exemplary sled sub-assembly that may be used in conjunction with the print head of FIGS. 2-5;

FIGS. 16, 17, and 18 are diagrammatic and cross-sectional illustrations of an exemplary cutting and feeding module that may be used in conjunction with the sled sub-assembly of FIGS. 6-9;

FIGS. 25, 26, 27, 28, 29, and 30 are diagrammatic and cross-sectional illustrations of an exemplary compaction module that may be used in conjunction with the sled sub-assembly of FIGS. 6-9.

SUMMARY

Figure 1:
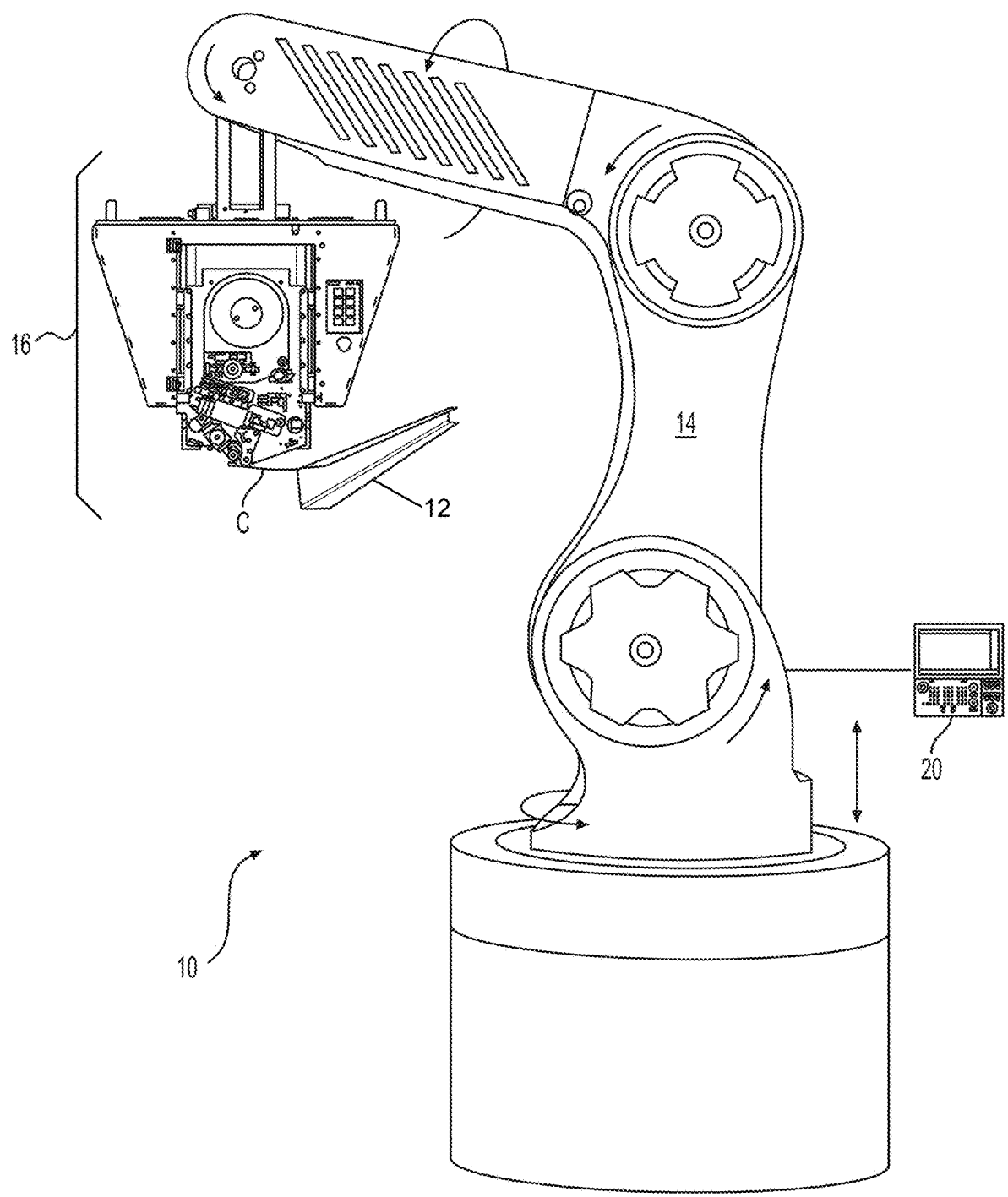
FIG. 1 is a diagrammatic illustration of an exemplary disclosed manufacturing system.

In one aspect, the present disclosure is directed to an additive manufacturing system. The additive manufacturing system may include a support, and a print head operatively connected to and moveable by the support. The print head may include a housing, a supply module operatively mounted to the housing and configured to hold a supply of continuous reinforcement, an impregnation module operatively mounted to the housing and configured to wet the continuous reinforcement with a matrix, and a clamping module operatively mounted to the housing downstream of the supply module relative to movement of a reinforcement through the print head. The clamping module may be configured to selectively clamp the continuous reinforcement. The additive manufacturing system may also include a controller in communication with the support and the print head and configured to coordinate operations of the support and the print head to fabricate a three-dimensional structure.

In another aspect, the present disclosure is directed to another additive manufacturing system. This additive manufacturing system may include a support, and a print head operatively connected to and moveable by the support. The print head may include at least one of a roller and a shoe configured to press in a first direction onto a continuous reinforcement discharged by the print head during movement of the print head in a second direction generally orthogonal to the first direction. The print head may include a guide configured to direct the continuous reinforcement to the at least one of the roller and the shoe along a trajectory that is oriented at an oblique angle relative to the first and second directions. The print head may also include a source configured to direct cure energy to the continuous reinforcement at a location trailing the at least one of the roller and the shoe. The additive manufacturing system may further include a controller in communication with the support, the print head, and the source. The controller may be configured to coordinate operations of the support, the print head, and the source to fabricate a three-dimensional structure.

In a further aspect, the at least one of the roller and the shoe may include a leading roller and a trailing roller.

In a further aspect, the leading roller has a diameter that may be different from the trailing roller.

In a further aspect, the leading roller has a diameter that may be greater than the trailing roller.

In a further aspect, the source may be configured to direct cure energy to the trailing location and to a location through the at least one of the roller and the shoe.

In a further aspect, the cure energy directed through the at least one of the roller and the shoe may be sufficient only to tack the continuous reinforcement in place and the cure energy directed to the trailing location may be sufficient to through-cure a matrix wetting the continuous reinforcement.

In a further aspect, the trailing location may be a location trailing the leading roller and leading the trailing roller.

In a further aspect, the trailing location may be a location trailing both the leading and trailing rollers.

In a further aspect, the source may be configured to direct the cure energy along a trajectory that angled rearward relative to the first direction.

In a further aspect, the source may be configured to direct the cure energy along a trajectory that is angled forward relative to the first direction.

In a further aspect, the source may be configured to direct the cure energy along a trajectory that is oblique relative to at least one of the first and second directions.

In a further aspect, the source may be configured to direct the cure energy along a trajectory that is oblique relative to both of the first and second directions.

In yet another aspect, the present disclosure may be directed to a method of additive manufacturing. The method may include directing a continuous reinforcement from a head-mounted supply module through an impregnation module to wet the continuous reinforcement with a matrix. The method may also include maintaining a desired non-zero level of tension within the reinforcement inside of the head, selectively clamping the continuous reinforcement at a location upstream of the impregnation module, and severing the continuous reinforcement at a location downstream of the impregnation module during the clamping.

In yet another aspect, the present disclosure may be directed to another method of additive manufacturing. This method may include discharging a matrix wetted continuous reinforcement from a print head and compacting the matrix wetted continuous reinforcement during discharge. The method may also include selectively exposing the matrix wetted continuous reinforcement to a cure energy at a first location to cure an exterior the matrix wetted continuous reinforcement, and selectively exposing the matrix wetted continuous reinforcement to the cure energy at a second location to cure an interior of the matrix wetted continuous reinforcement.

In a further aspect, selectively exposing the matrix wetted continuous reinforcement to the cure energy at the first location includes directing the cure energy toward the matrix wetted continuous reinforcement along a trajectory that is oblique relative to at least one of an axis of the matrix wetted continuous reinforcement and a force direction of the compacting.

DETAILED DESCRIPTION

For the purposes of this disclosure, the term "about" as used herein serves to reasonably encompass or describe minor variations in numerical values measured by instrumental analysis or as a result of sample handling. Such minor variations may be in the order of plus or minus 0% to 10%, plus or minus 0% to 5%, or plus or minus 0% to 1% of the numerical values. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

FIG. 1 illustrates an exemplary system 10, which may be used to manufacture a composite structure 12 having any desired shape, size, configuration, and/or material composition. System 10 may include at least a support 14 and a head 16. Head 16 may be coupled to and moveable by support 14 during discharge of a composite material (shown as C). In the disclosed embodiment of FIG. 1, support 14 is a robotic arm capable of moving head 16 in multiple directions during fabrication of structure 12. Support 14 may alternatively embody a gantry (e.g., an overhead-bridge gantry, a single-post gantry, etc.) or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive or coupler 18 may mechanically join head 16 to support 14, and include components that cooperate to move portions of and/or supply power and/or materials to head 16.

Head 16 may be configured to receive or otherwise contain a matrix that, together with a continuous reinforcement (and any other additives, fillers, catalysts, initiators, etc.), makes up the composite material discharging from head 16. The matrix may include any type of material that is curable (e.g., a liquid resin, such as a zero-volatile organic compound resin, a powdered metal, etc.). Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16 and pushed or pulled out of head 16 along with one or more continuous reinforcements. In some instances, the matrix inside head 16 may benefit from cooled and/or shaded (e.g., in order to inhibit premature curing or otherwise obtain a desired rate of curing after discharge). In other instances, the matrix may need to be warmed and/or illuminated for similar reasons. In either situation, head 16 may be specially configured (e.g., insulated, temperature-controlled, shielded, etc.) to provide for these needs.

The matrix may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within (e.g., on one or more separate internal creels 19) or otherwise passed through head 16 (e.g., fed from one or more external spools—not shown). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix discharging from head 16.

The reinforcements may be exposed to (e.g., at least partially coated with) the matrix while the reinforcements are inside head 16, while the reinforcements are being passed to head 16, and/or while the reinforcements are discharging from head 16. The matrix, dry reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers), additive (e.g., nanoparticles), catalyst, initiator, etc. may be mixed with the matrix before and/or after the matrix coats the continuous reinforcements.

As will be explained in more detail below, one or more cure enhancers (e.g., a UV light, an ultrasonic emitter, a laser, a heater, a catalyst dispenser, etc.) may be mounted proximate (e.g., within, on, or adjacent) head 16 and configured to enhance a cure rate and/or quality of the matrix as it discharges from head 16. The cure enhancer(s) may be controlled to selectively expose portions of structure 12 to energy (e.g., to UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, or otherwise cause the matrix to cure as it discharges from head 16. The amount of energy produced by the cure enhancer(s) may be sufficient to cure the matrix before structure 12 axially grows more than a predetermined length away from head 16. In one embodiment, structure 12 is cured before the axial growth length becomes equal to an external diameter of the matrix-coated reinforcement.

The matrix and/or reinforcement may be discharged from head 16 via at least two different modes of operation. In a first mode of operation, the matrix and/or reinforcement are extruded (e.g., pushed under pressure and/or mechanical force) from head 16 as head 16 is moved by support 14 to create the 3-dimensional trajectory within a longitudinal axis of the discharging material. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the reinforcement is being pulled from head 16, the resulting tension in the reinforcement may increase a strength of structure 12 (e.g., by aligning the reinforcements, inhibiting buckling, etc.), while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as head 16 is moved by support 14 away from an anchor point (e.g., a print bed, a table, a floor, a wall, a surface of structure 12, etc.). For example, at the start of structure formation, a length of matrix-impregnated reinforcement may be pulled and/or pushed from head 16, deposited onto the anchor point, and at least partially cured, such that the discharged material adheres (or is otherwise coupled) to the anchor point. Thereafter, head 16 may be moved away from the anchor point and the relative movement may cause the reinforcement to be pulled from head 16. It should be noted that the movement of reinforcement through head 16 could be assisted via one or more internal feed mechanisms, if desired. However, the discharge rate of reinforcement from head 16 may primarily be the result of relative movement between head 16 and the anchor point, such that tension is created within the reinforcement. It is contemplated that the anchor point could be moved away from head 16 instead of or in addition to head 16 being moved away from the anchor point.

A controller 20 may be provided and communicatively coupled with support 14, head 16, and any number of the cure enhancer(s). Each controller 20 may embody a single processor or multiple processors that are specially programmed or otherwise configured to control an operation of system 10. Controller 20 may include one or more general or special purpose processors or microprocessors. Controller 20 may further include or be associated with a memory for storing data such as, for example, design limits, performance characteristics, operational instructions, tool paths, and corresponding parameters of each component of system 10. Various other known circuits may be associated with controller 20, including power supply circuitry, signal-conditioning circuitry, solenoid driver circuitry, communication circuitry, and other appropriate circuitry. Moreover, controller 20 may be capable of communicating with other components of system 10 via wired and/or wireless transmission.

One or more maps may be stored in the memory of controller 20 and used by controller 20 during fabrication of structure 12. Each of these maps may include a collection of data in the form of lookup tables, graphs, and/or equations. In the disclosed embodiment, controller 20 may be specially programmed to reference the maps and determine movements of head 16 required to produce the desired size, shape, and/or contour of structure 12, and to responsively coordinate operation of support 14, the cure enhancer(s), and other components of head 16.

An exemplary head 16 is disclosed in greater detail in FIGS. 2-5. As can be seen in these figures, head 16 may include, among other things, a housing 22 that is configured to hold, enclose, contain, and/or provide mounting for a component sled ("sled") 24. Housing 22 may include any number of panels connected to each other to form a multi-sided enclosure that supports and protects sled 24. In the disclosed embodiment, the enclosure of housing 22 is generally three-sided (e.g., U-shaped), such that sled 24 can be accessed from a frontside, a backside, and a bottom side that is oriented opposite coupler 18. Sled 24 may extend past a terminal end of housing 22 at the bottom side.

Housing 22 may include at least a top portion 26, a first side portion 28, and a second side portion 30. First and second side portions 28, 30 may each be elongated, having a wider proximal end rigidly connected to top portion 26 and a narrower distal end cantilevered from the proximal end. The narrower distal ends may angle toward a center of the U-shape, thereby forming an outer taper that improves a form factor of head 16 (e.g., by allowing a discharge end of head 16 to fit into tighter spaces). First and second side portions 28, 30 may be spaced away from each other to form an opening for sled 24 therebetween. One or each of first and second side portions 28, 30 may form an outward facing (e.g., facing transversely away from each other) pocket 32 that is configured to receive one or more functional and/or control components of head 16. Coupler 18 may be connected to top portion 26 and used to quickly and releasably connect head 16 to support 14. One or more racking mechanisms (e.g., handles, hooks, eyes, etc.) 34 may be located adjacent coupler 18 and used to rack head 16 (e.g., during tool changing) when not connected to support 14.

Sled 24 may be mounted within the opening between first and second side portions 28, 30, and configured slide in a direction generally orthogonal to top portion 26 (e.g., between the top and bottom of head 16, as shown in FIGS. 1 and 2). In the disclosed embodiment, sled 24 includes a mounting plate 36 having any number of bearings 38 located at opposing lateral edges. Bearings 38 may embody roller bearings, air bearings, slide bearings, or any other type of low-friction bearings that slidingly and/or rollingly engage corresponding guide features (e.g., rails) 40 located inside of housing 22. One or more actuators (e.g., a pair of pneumatic cylinders, an air bladder, a shock absorber, etc.) 42 may be connected between top portion 26 and mounting plate 36 to affect (e.g., assist, cause, cushion, etc.) movement of sled 24 within housing 22. For example, actuator(s) (42) may selectively raise sled 24, lower sled 24, and/or simply vary (e.g., increase and/or decrease) a magnitude of an external force required to raise and/or lower sled 24.

As shown in FIGS. 6, 7, 8, and 9, any number of additional components of head 16 may be connected to housing 22 via mounting plate 36 and/or pocket(s) 32. For example, a reinforcement supply module 44, a clamping module 46, an impregnation module 48, a cutting/feeding module 52, and/or a compacting/curing module 54 may be connected to and move with mounting plate 36. It is contemplated, however, that fewer of these modules may be mounted to sled 24, if desired, to reduce an inertia thereof. Any number of conduits, valves, actuators, chillers, heaters, manifolds, wiring harnesses, and other similar components may be co-mounted to one or more common panels that are removably mounted inside of pocket(s) 32.

As will be described in more detail below, reinforcement may pay out from module 44, pass through and be wetted with matrix in module 48, and fed by module 52 to module 54 for compaction against a print surface or discharge into free space. Before, during, and/or after compaction, module 54 may expose the matrix coating on the reinforcement to energy that triggers curing, enhances curing, and/or completely cures the matrix. At select times, module 46 may clamp the reinforcement in preparation for severing by module 52 and/or when moving between discharge locations.

Figure 10:
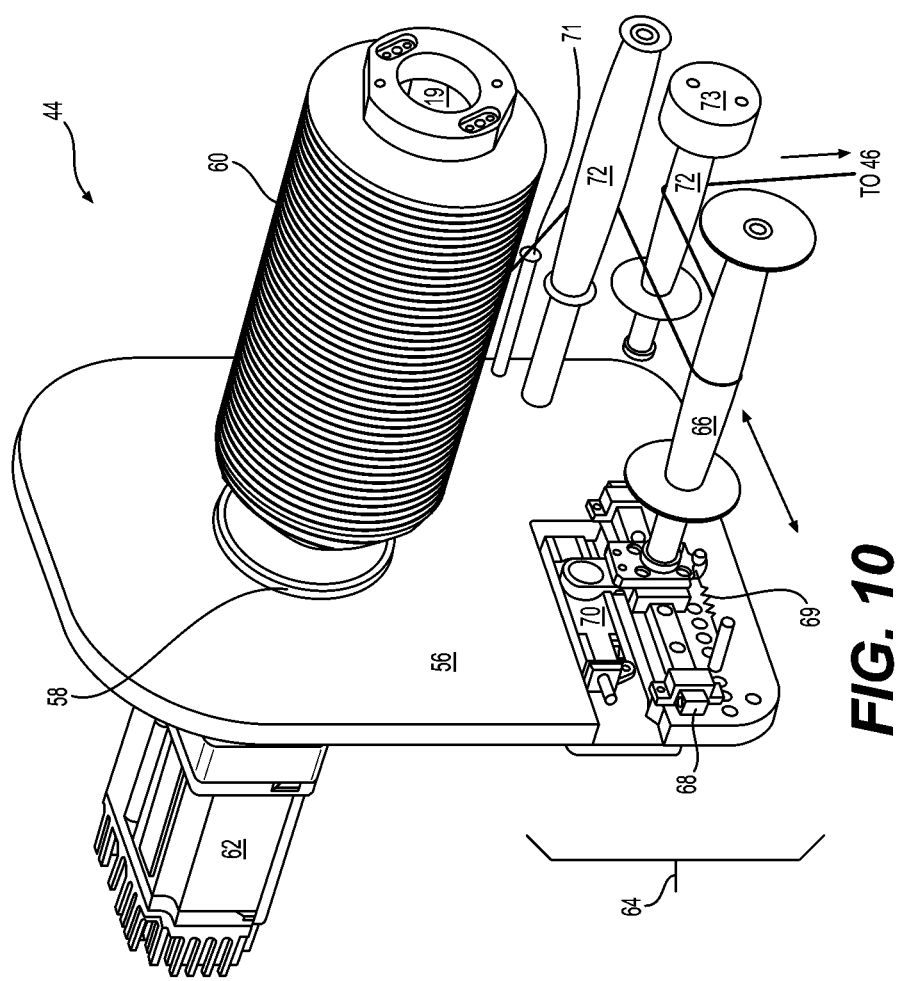
FIG. 10 is a diagrammatic illustrations of an exemplary supply module that may be used in conjunction with the sled sub-assembly of FIGS. 6-9.

As shown in FIG. 10, supply module 44 may be a subassembly that includes, among other things, a mounting plate 56 to which creel 19 is rotationally connected (e.g., via a bearing 58); a bobbin, spool, and/or other supply 60 of reinforcement that is supported by creel 19; an actuator (e.g., a rotary motor and/or gearbox, a rotary fluid damper, an electromagnet brake, etc.) 62 configured to selectively drive rotation of creel 19; and a tensioning subassembly 64 configured to monitor and/or provide a desired level of tension within the reinforcement received from supply 60. Supply module 44 may be removably connected to mounting plate 36 of sled 24.

Tensioning subassembly 64 may include components that cooperate to generate signals indicative of a level of tension within the reinforcement passing from supply 60 to module 46. These components may include, among other things, an idler 66 that is moveable (e.g., translatable, slidable, rollable, rotatable, pivotable, etc.) along a rail or other similar support 68, and a sensor 70 configured to detect the translation and responsively generate a corresponding signal. Any number of redirects (e.g., stationary or moveable rollers, pins, etc.) 72 may be associated with subassembly 64 and disposed upstream and/or downstream of idler 66 (e.g., relative to passage of reinforcement through head 16). As shown in FIG. 10, idler 66 and/or redirect(s) 72 may embody crowned rollers having end-located flanges. In one embodiment, the further downstream roller(s) (i.e., the component(s) furthest away from creel 19, such as redirect 72 in the illustrated embodiment) may have larger-diameter flanges that help to guide the reinforcement. The components closer to creel 19 may have a lesser need for such guidance. It is contemplated that guide mechanisms other than or in addition to rollers could be utilized, if desired. For example, one or more stationary and/or center-biased eyelets (e.g., ceramic coated eyelets) 71 could be utilized to help center the reinforcement from creel 19 onto redirects 72. It is also contemplated that the rollers may be uncrowned and/or flangeless, if desired.

In one example, an encoder, potentiometer, or other similar sensor 73 may be associated with one or more redirects 72 of tensioning subassembly 64. For example, FIG. 10 illustrates encoder 73 being connected to a downstream (i.e., downstream of idler 66) redirect 72. In this arrangement, encoder 73 may generate a signal indicative of payout of the reinforcement passing over the associated redirect 72, prior to the reinforcement being wetted with matrix. This location of encoder 73 may reduce a likelihood of interference from movement of idler 66 and contamination from the matrix. The signal generated by encoder 73 may be directed to controller 20 for further processing.

It should be noted that encoder 73, although shown and described as being associated with module 44, could be located elsewhere within head 16. For example, in some embodiments, encoder 73 may be located downstream of module 46. At this alternative location, signals from encoder 73 may be able to detect breakage of the reinforcement within module 46. In addition, although the reinforcement is shown as wrapping around only a small portion of the redirect 72 associated with encoder 73, it has been found that a greater angle of wrap may increase reliability of encoder 73. That is, a greater angle may reduce a likelihood of the reinforcement slipping on redirect 72. In one embodiment, the wrap angle may be greater than 90°, greater than 180°, greater than 270°, or greater than 360°.

The reinforcement may extend (e.g., serpentine) from supply 60 and around idler 66 (and any included redirect(s) 72), before passing to module 46 (referring to FIGS. 6-9 and 11), and varying levels of tension within the reinforcement may cause the translation of idler 66 towards and/or away from redirect(s) 72. For example, as tension with the reinforcement increases, idler 66 (along with at least a portion of sensor 70) may be pulled toward redirect 72 (e.g., in a directional generally orthogonal to a translational direction of sled 24) by the reinforcement. In contrast, as tension with the reinforcement decreases, idler 66 may be biased (e.g., via a spring 69) away from redirect 72. The translation of idler 66 and the moveable portion of sensor 70 may result in generation of one or more signals that are related (e.g., proportional) to the position, velocity, and/or acceleration of idler 66. These signals may be directed to controller 20 (referring to FIG. 1) for further processing. It should be noted that a force applied by spring 69 may be greater than a combined weight of idler 66 and sensor 70, such that, regardless of the tilt direction of head 16, at least some tension may still be applied to the reinforcement.

Actuator 62 may be selectively caused (e.g., energized by controller 20) to rotate, to stop rotating, and/or to rotate at a faster or slower rate based on the signals generated by sensor 70, thereby adjusting the level of tension within the reinforcement. For example, in response to the increasing-tension signal generated by sensor 70, actuator 62 may be caused to pay out more reinforcement or to pay out reinforcement at a higher rate. This adjustment may result in a lower tension with the reinforcement and translation of idler 66 away from redirect 72. In contrast, in response to the decreasing-tension signal generated by sensor 70, actuator 62 may be caused to pay out less reinforcement or to pay out reinforcement at a slower rate. This adjustment may result in a higher tension with the reinforcement and translation of idler 66 back towards redirect 72. A desired level and/or range of tension may be maintained within the reinforcement via this configuration. In one application, the desired range of tension may be about 0-5 lbs.

Figure 11:
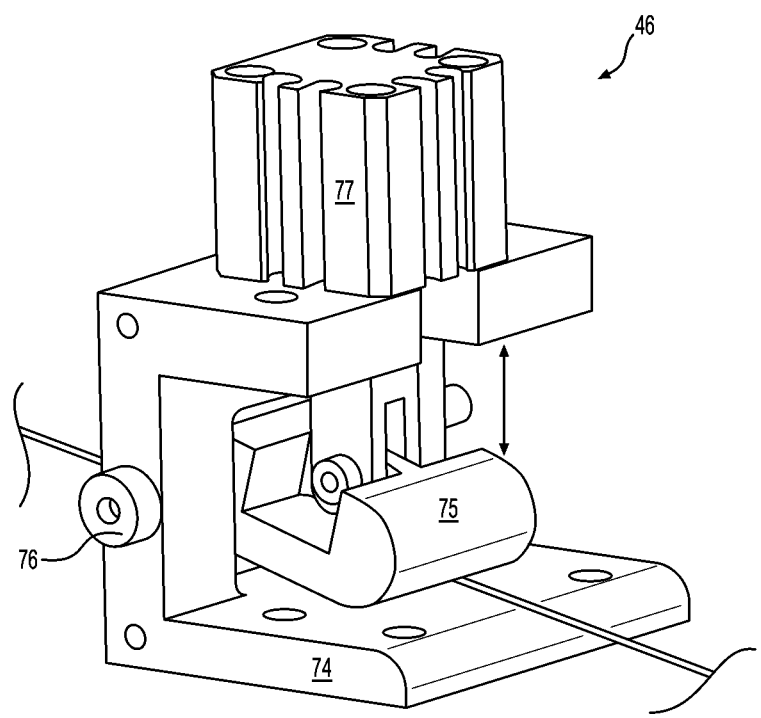
FIG. 11 is a diagrammatic illustrations of an exemplary clamping module that may be used in conjunction with the sled sub-assembly of FIGS. 6-9.

As shown in FIG. 11, clamping module 46 may be a subassembly having components, which cooperate to selectively clamp the reinforcement and thereby inhibit movement (e.g., any movement, only forward movement, or only reverse movement) of the reinforcement through head 16. This may be helpful, for example, during severing of the reinforcement away from structure 12, such that tensioning subassembly 64 does not unintentionally pull the reinforcement back through head 16. In other words, clamping module 46 may selectively function as a check-valve, ensuring unidirectional movement of the reinforcement through head 16. The components of module 46 may include, among other things, an anvil 74 that is removably connectable to mounting plate 36 of sled 24, a shoe 75 that is pivotally connected to anvil 74 via a pin 76, and an actuator (e.g., a linear cylinder) 77 that is mounted to anvil 74 and configured to selectively pivot shoe 75 about pin 76 and thereby sandwich the reinforcement between shoe 75 and anvil 74.

As shown in FIG. 11, anvil 74 may have a generally C-shaped cross-section, with an opening passing through a spine of the C-shape. The reinforcement received from module 44 may pass through this opening at a location between pivot pin 76 and a base or mounting portion of the C-shape. When actuator 77 is in an extended position (shown in FIG. 11), shoe 75 may be forced against the reinforcement and base portion of the C-shape. When actuator 77 is moved to a retracted position, shoe 75 may be pulled away from the reinforcement, such that movement of the reinforcement through anvil 74 is substantially uninhibited by shoe 75. It is contemplated that actuator 77 may be moved to any position between the extended and retracted positions, thereby varying an amount of friction applied to the passing reinforcement, if desired.

In the disclosed embodiment, shoe 75 may include a heel end and a tow end. The heel end of shoe 75 may be connected to anvil 74 via pin 76, and the tow end may have a rounded outer surface that is configured to selectively engage the reinforcement when actuator 77 is moved toward the extended position. Actuator 77 may pivotally connect to shoe 75 at a location between the heel- and tow-ends, thereby providing a mechanical advantage that multiplies a force generated by actuator 77 and applied by the rounded outer surface of shoe 75 to the reinforcement.

In one embodiment, the engagement motion of shoe 75 may function to increase a clamping force applied to the reinforcement as the reinforcement is urged in reverse direction through anvil 74 (e.g., by tensioning subassembly 64). For example, a moment may be created at the toe-end of shoe 75, which pulls shoe 75 with greater force into the underlying base surface of anvil 74, thereby creating more friction on the reinforcement. As the reinforcement is thereafter pulled in the normal payout direction, a reverse moment may be created that unlocks shoe 75 from the reinforcement, resulting in a lower level of friction on the reinforcement. In one embodiment, materials selected for anvil 74 and/or shoe 75 may be low-friction materials (e.g., bronze, PTFE, FEP, etc.). In another embodiment, any of anvil 74 and/or shoe 75 may be coated with the low-friction materials.

It is contemplated that clamping module 46 could be replaced with one or more rollers having a clutched bearing, if desired. The reinforcement would pass freely in the normal payout direction, but the bearing would be inhibited from rotating in a reverse direction. This design, while adding some level of back tension to movement of reinforcement through head 16, may be simpler, cheaper, and require little to no timing control.

Figure 12:
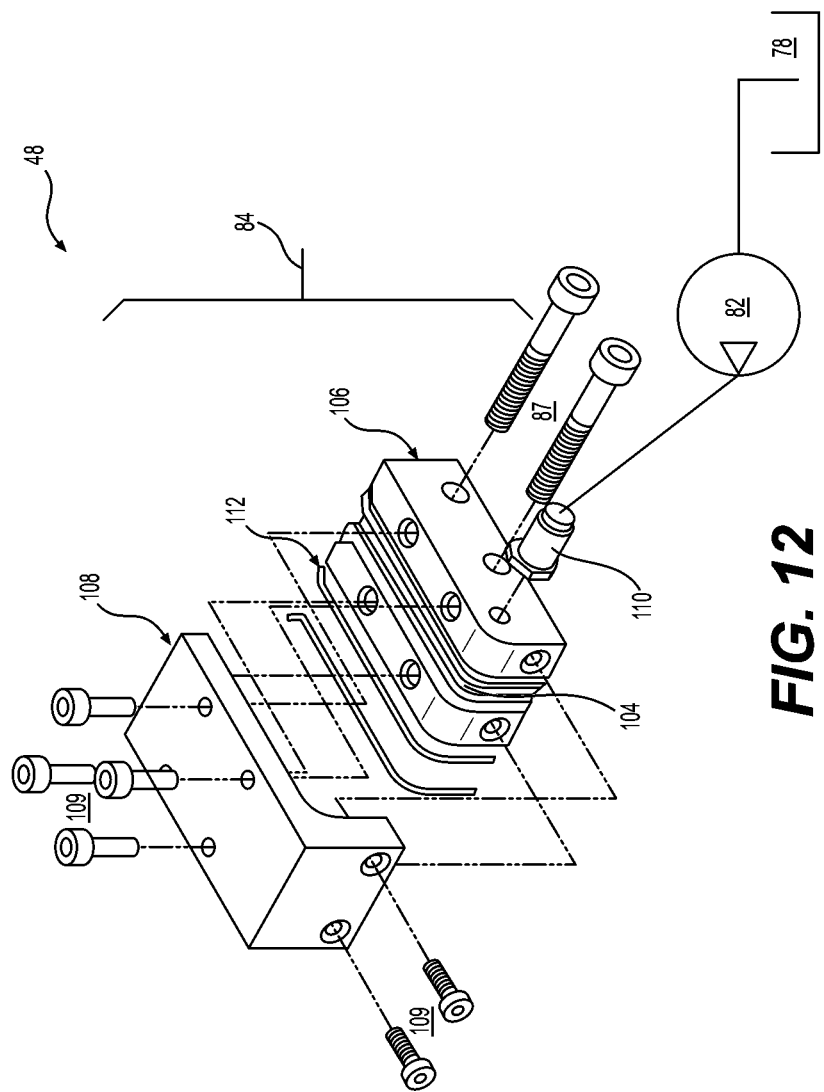
FIGS. 12, 13, 14 and 15 are diagrammatic and cross-sectional illustrations of an exemplary wetting module that may be used in conjunction with the sled sub-assembly of FIGS. 6-9.

As shown in FIG. 12, impregnation module 48 may be a subassembly that includes, among other things, a matrix reservoir 78, one or more pumps 82 fluidly connected to draw matrix from reservoir 78, and a wetting mechanism 84 fluidly connected to receive pressurized matrix from pump (s) 82. In one embodiment, two cyclical pumps 82 are included and phase-shifted relative to each other, such that mechanism 84 is provided with a consistent flow (i.e., a flow without significant pressure pulsation) of pressurized matrix. In another embodiment, a single constant-pressure pump is utilized.

In the disclosed embodiment, reservoir 78 is a local vessel configured to contain within head 16 an amount of matrix sufficient to wet an entire spool or other supply 60 of reinforcement mounted on creel 19 (referring to FIG. 1). In this embodiment, reservoir 78 may be connected to pump(s) 82 in a quickly removable manner to allow for cleaning, replacement, and/or replenishment. It is contemplated that, in some embodiments, reservoir 78 could be mounted remotely from the rest of impregnation module 48, if desired. For example, reservoir 78 could be mounted at another location on support 14 or even offboard, and connected by way of an external conduit (not shown). It is further contemplated that reservoir 78 could embody a consumable cartridge that is periodically replaced when depleted.

As can be seen within FIG. 12, mechanism 84 may be a subassembly of components that cooperate to create a pressure differential in the matrix across the associated reinforcement being wetted. These components may include, among other things, a base 106, a cover 108, and any number of fasteners (e.g., bolts, clasps, hinges, buckles, etc.) 109 configured to removably connect cover 108 to base 106. At least one of base 106 and cover 108 may contain at least one pressure surface 104. In the disclosed embodiment, only a single pressure surface 104 is included and located within only base 106. In this embodiment, cover 108 may provide access to pressure surface 104 for purposes of threading, cleaning, etc. It should be noted, however, that multiple pressure surfaces 104 could alternatively be included and located within only base 106, within only cover 108, or within a combination of base 106 and cover 108.

In the disclosed example, pressure surface 104 is a transversely flat (i.e., relative to a travel direction of the reinforcement through mechanism 84) and lengthwise rounded surface having an arc angle of about 90°. Pressure surface 104 may have a width and a height that are each greater than a diameter of the corresponding reinforcement for which mechanism 84 is designed to function. It should be noted that the angle and/or the radius of pressure surface 104 may be a function of the reinforcement diameter, a desired reinforcement-to-matrix ratio, and/or a level of tension within the reinforcement as it passes over and against pressure surface 104. It is also contemplated that a property of the reinforcement (e.g., brittleness, reinforcement diameter, reinforcement density, etc.) may additionally affect the angle and/or radius of pressure surface 104. Finally, it is contemplated that pressure surface 104 could alternatively or additionally be rounded in a transverse direction, if desired.

Matrix pressurized by pump(s) 82 may pass to the reinforcement inside of mechanism 84 at a location upstream of pressure surface 104. To facilitate the fluid flow, a passage 110 may extend internally and/or externally from pump(s) 82 to base 106 (and/or from cover 108, if pressure surface 104 is located therein) at the upstream location. It is contemplated that, in embodiments having multiple pressure surfaces 104, multiple passages 110 may be included and each separately associated with a specific pressure surface 104. One or more seals 112 may be located at sides of pressure surface 104 to inhibit undesired leakage therefrom.

Any part(s) of module 48 may be warmed, chilled, or otherwise conditioned to selectively affect wetting of the reinforcement with matrix and/or other properties of structure 12. In the disclosed example, module 48 is warmed by way of a heater (e.g., one or more heated electrodes—not shown) associated with passage 110 and/or mechanism 84. One or more sensors (not shown) may be paired with the heater (or another conditioning device) and configured (e.g., located and programmed) to generate feedback signals directed to controller 20.

Figure 13:
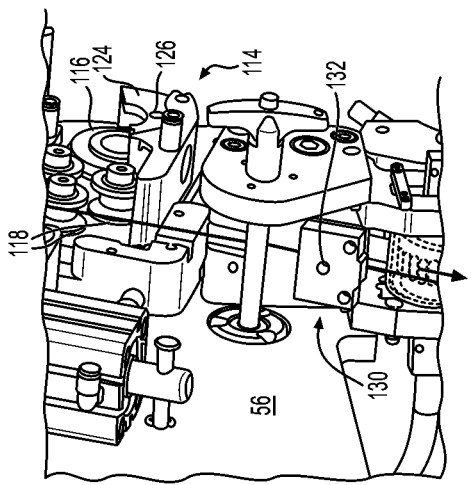
Figure 15:
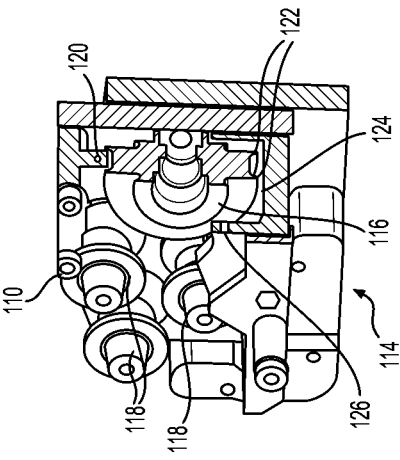
Figure 14:
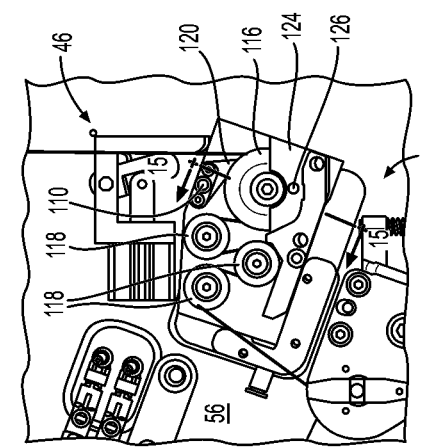

An alternative wetting mechanism 114 is illustrated in FIGS. 13-15. Like wetting mechanism 84, wetting mechanism 114 may include at least one pressure surface that receives liquid matrix from a remote source (e.g., from pump(s) 82) and generates a pressure gradient to force the matrix through the reinforcement. However, in contrast to the stationary rounded surface of wetting mechanism 84, wetting mechanism 114 may include a plurality of rotating cylindrical pressure surfaces. For example, wetting mechanism 114 may include a primary surface 116 and any number of (e.g., three) secondary surfaces 118 located downstream from primary surface 116. The reinforcement may be first wetted at surface 116 and alternatingly wrap around each of surfaces 118 from different sides.

A port 120 may feed matrix onto an outer annular portion of surface 116, upstream of where the reinforcement makes first contact. This matrix may be trapped within a channel formed by end-flanges 122 of surface 116 and a first side of the reinforcement, such that the engagement of the reinforcement with the outer annular portion of surface 116 increases a pressure of the matrix and creates the above-described gradient. In the disclosed embodiment, the reinforcement wraps around about 170-190° (e.g., about 180°) of surface 116 before extending to a next surface 118. It is contemplated that the annular portion of surface 116 may be completely cylindrical, concave, or convex, as desired. A concave surface may aid to separate individual fibers of the reinforcement and thereby enhance wetting.

In disclosed embodiment, excess matrix (i.e., matrix not picked up by the reinforcement) may drip from surface 116 into a collection reservoir 124. Reservoir 124 may be crescent shaped, concentric with surface 116, located gravitationally below surface 116, and extend radially inward past a periphery of surface 116, such that reservoir 124 may function as both a collection vessel and an additional bath for the reinforcement when filled with the matrix. An overflow port 126 may be formed at a side of reservoir 124 to inhibit undesired leakage of matrix over edges of reservoir 124.

The reinforcement may pass over each of surfaces 118 located alternatingly at opposing sides of the reinforcement. This may create alternating pressure gradients that help to ensure that the liquid matrix picked up at surface 116 and from reservoir 124 is equally distributed across a width of the reinforcement. Each of surfaces 118 may be shaped similar to surface 116 to form a channel in which the reinforcement may ride. A diameter of surfaces 118 may be about the same or smaller than a diameter of surface 116.

In some applications, additional control over wetting may be beneficial. In these applications, an additional wetting device 130 may be located downstream of mechanism 114. As shown in FIG. 12, device 130 may embody a nozzle having an inlet cross-sectional area that is larger than an outlet cross-sectional area. In one embodiment, the inlet and/or outlet cross-sectional areas may have a generally rectangular shape, such that rectangularly shaped reinforcements are not distorted during passage therethrough. In some embodiments, the rectangularly shape at the nozzle outlet may be designed to impart a shape (e.g., reduce and/or provide a constant width thereof), if desired. In other embodiments, however, another shape (e.g., circular) may be simpler and/or cheaper to fabricate accurately.

The cross-sectional area at the nozzle outlet may be selected to provide a desired fiber-volume-fraction (FVF) or ratio of reinforcement-to-matrix. In the disclosed embodiment, the cross-sectional area at the nozzle outlet may be selected to provide an FVF of about 30-60%. That is, the cross-sectional area at the nozzle outlet may be about 0.67 to 2.5 times the cross-sectional area of the reinforcement passing therethrough. Device 130 may be coated, in some applications, with a low-friction material that reduces damage to the reinforcement during passage therethrough.

The cross-sectional area at the nozzle outlet may function to scrape away excess matrix clinging to the reinforcement passing therethrough, and the excess matrix may build up within the nozzle. Thereafter, as a reinforcement having too little matrix clinging thereto passes through device 130, the built-up volume of matrix may function as an additional bath for the reinforcement, allowing the reinforcement to pick up extra matrix. In some applications excess resin is intentionally pumped into device 130, such that at least some resin builds up within the nozzle. For example, 2-3 times as much resin as needed to fully saturate the reinforcement may be pumped into device 130. An overflow port 132 may be situated to draw away excess matrix before it can leak over the upper edges of device 130. From device 130, the wetted reinforcement may pass to module 52.

As shown in FIGS. 16, 17 and 18 module 52 may be a subassembly of components that cooperate to selectively feed the reinforcement through head 16. These components may include, among other things, a swing arm 136, a feed roller 138 located at a first end of swing arm 136, and a rotary actuator 140 (e.g., a motor and/or gear box combination) mounted to a mid-portion of swing arm 136 and operatively connected to drive rotation of feed roller 138 (e.g., via a belt 141 and pulley 142). Swing arm 136 may generally embody a right triangle that is rotationally and removably connectable to mounting plate 36 of sled 24 (referring to FIGS. 6-9) at a pivot point 143 (e.g., via a pin—not shown). In this embodiment, pivot point 143 is located at the right-angle portion of the triangle, opposite the corresponding hypotenuse, and feed roller 138 is located at an intersection of the hypotenuse and a shortest leg. A linear actuator (e.g., a pneumatic piston—shown only in FIG. 17, for clarity) 144 may pivotally connect the remaining triangular corner of swing arm 136 to plate 36. With this configuration, an extension or retraction of actuator 140 may function to rotate swing arm 136, feed roller 138, and rotary actuator 140 about pivot point 143 in clockwise and counterclockwise directions, respectively. It should be noted that swing arm 136 could have another shape (e.g., a non-right triangular shape), if desired.

Swing arm 136 may be pivoted between an engaged position and a disengaged position. When swing arm 136 is in the engaged position (e.g., caused by extension of linear actuator 144), feed roller 138 may be pressed against compaction module 54 (referring to FIGS. 6-9) to sandwich the reinforcement therebetween. A driving rotation of rotary actuator 140 at this time may cause feed roller 138 to push the reinforcement from head 16. Feed roller 138 may primarily be used during start of a new printing event, where a loose end of matrix-wetted reinforcement is pushed out of head 16. When swing arm 136 is in the disengaged position (e.g., caused by retraction of linear actuator 144), feed roller 138 may be away from compaction module 54 and have little or no effect on movement of the reinforcement.

In some applications, it has been found that the reinforcement can undesirably stick to feed roller 138 when the reinforcement is wetted with matrix. Unless otherwise accounted for, the reinforcement could thereafter be caused to wind around feed roller 138, even when feed roller 138 is moved to the disengaged position. To ensure that the reinforcement feeds through head 16 without sticking to feed roller 138, a flow of pressurized medium (e.g., air or an inert gas) may be passed through feed roller 138 and against the reinforcement to push the reinforcement radially away from a surface of feed roller 138. This medium may be directed through a port 146 located at an end of feed roller 138, passed axially into feed roller 138 via a hollow shaft 148, and ejected radially from feed roller 138 via any number of orifices 150. Shaft 148 may be mounted to swing arm 136 via any number and type of bearings 152.

Figure 19:
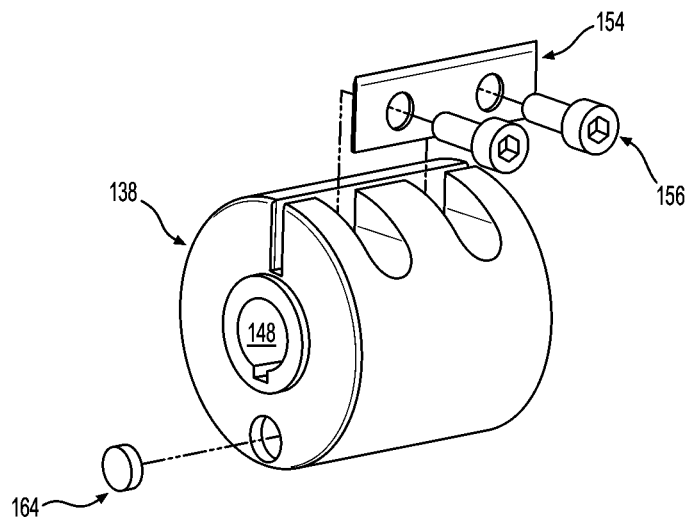
FIGS. 19, 20, and 21 are diagrammatic and cross-sectional illustrations of an exemplary cut and feed wheel that may be used in conjunction with the cutting and feeding module of FIGS. 16-19.
Figure 20:
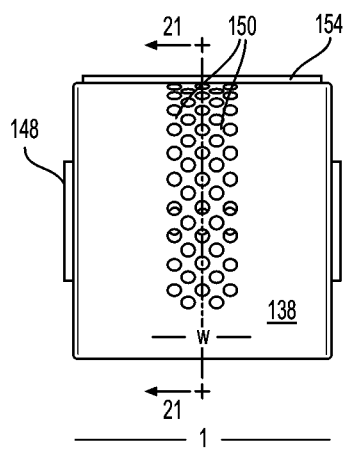
Figure 21:
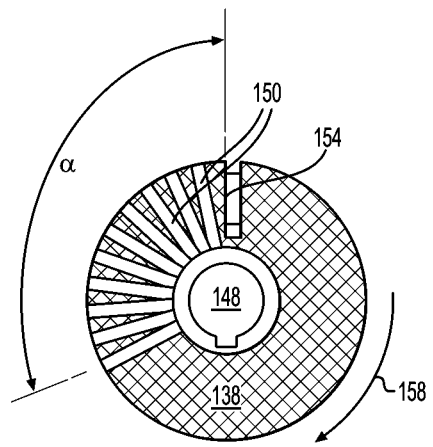

As shown in FIGS. 19, 20 and 21, orifices 150 may be arranged in one or more circumferential rows that extend through an arc α of about 90-250° (e.g., about 240°). This arc length, in combination with a diameter of feed roller 138, may help ensure that a length of the arc α is about equal to a feed distance such that an entire tag end of the reinforcement can be pushed off feed roller 138 and onto module 54. In the disclosed embodiment, five circumferential rows of orifices 150 are included, and orifices 150 may be staggered between adjacent rows. An outer surface width w across the rows of orifices 150 on feed roller 138 may be about ½ of an axial length 1 of feed roller 138.

It has been found that diameters of feed roller 138 and/or module 54 may additionally affect sticking of the reinforcement described above. For example, a smaller diameter of feed roller 138 (i.e., smaller than the diameter of module 54) may cause a wetted reinforcement to be more likely to adhere to and follow module 54. In one example, a circumference of feed roller 138 may large enough to advance the reinforcement from a location of cut to a tool center point (TCP) of module 54 in less than one revolution of feed roller 138. As will be understood from the description of feed roller 138 below, this relationship may prevent unintentional severing of the reinforcement. In general, feed roller 138 may be about ¾ of a diameter of module 54, and the reinforcement may wrap around about 110° of the circumference of module 54.

In some embodiments, feed roller 138 may additionally function as a cutting mechanism. For example, a cutting device (e.g., an axially extending blade) 154 may be mounted to and extend radially out past the outer surface of feed roller 138. Cutting device 154 may be removably connected to feed roller 138 (e.g., via one or more fasteners 156 that are recessed into feed roller 138), such that cutting device 154 can be periodically serviced and/or replaced. Cutting device 154 may be selectively activated (e.g., by controller 20) via controlled extension of actuator 144 (referring to FIG. 17) that causes cutting device 154 to be pushed radially through the reinforcement and against a portion of module 54 (referring to FIG. 6).

The circumferential location of cutting device 154 may be strategically selected relative to the locations of orifices 150 and a normal rotational direction of feed roller 138 (e.g., as represented by an arrow 158). For example, cutting device 154 may be situated to lead orifices 150, and the arc α of orifices 150 may begin at or immediately behind cutting device 154. This arrangement may allow for a loose end of the reinforcement, which has been severed by cutting device 154, to be immediately pushed away from cutting device 154 and towards module 54 for subsequent tacking of a new path.

The orientation of feed roller 138 may be selectively regulated by controller 20 based on feedback from a sensor. In the disclosed embodiment, the sensor is a non-contact sensor having one or more elements (e.g., an imbedded magnet, a slotted disk, an optical stripe, etc.—shown only in FIG. 19) 164 that are detected by an associated receiver (e.g., an electronic eye, a camera, a semi-conductor, an electronic circuit, etc.—shown only in FIG. 16) 162. When the indexing element(s) 164 is placed within proximity of the receiver 162, the receiver may generate a signal corresponding to the proximity. This signal may be directed to controller 20 for further processing and use in activating actuators 140 and/or 144.

Figure 22:
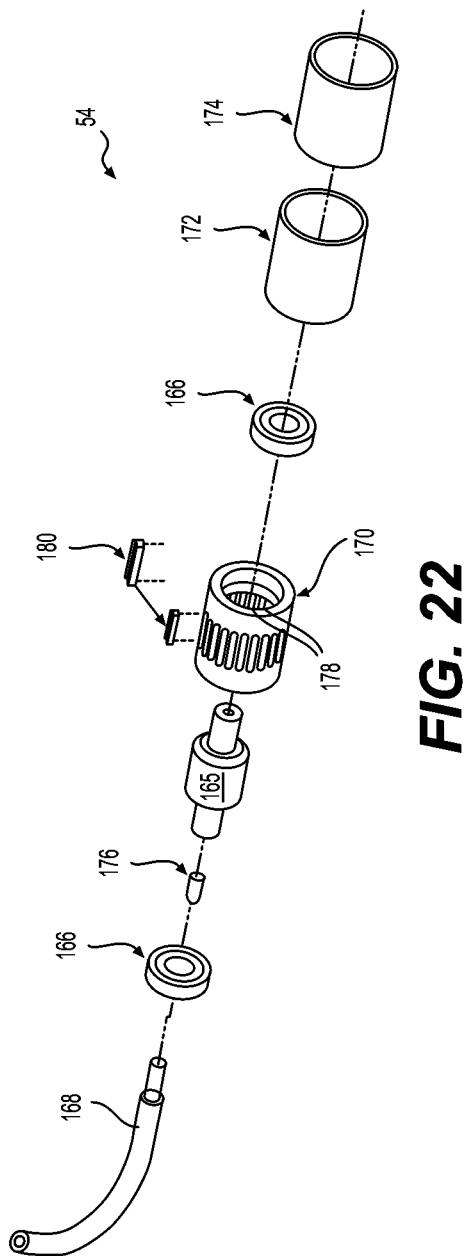
FIGS. 22, 23 and 24 are exploded, diagrammatic and cross-sectional illustrations of an exemplary cure module that may be used in conjunction with the sled sub-assembly of FIGS. 6-9.
Figure 23:
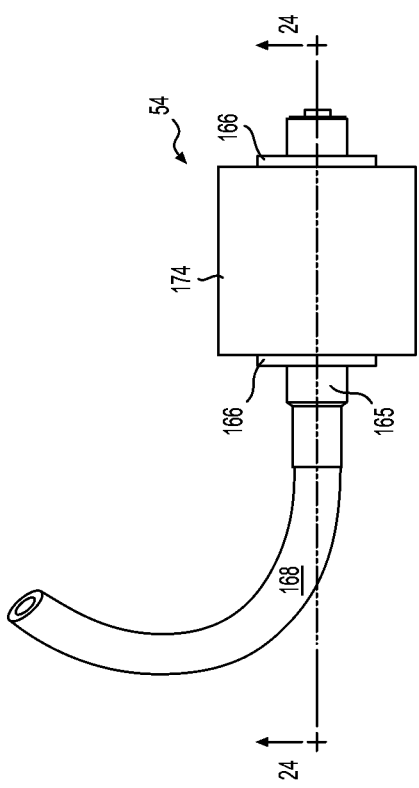
Figure 24:
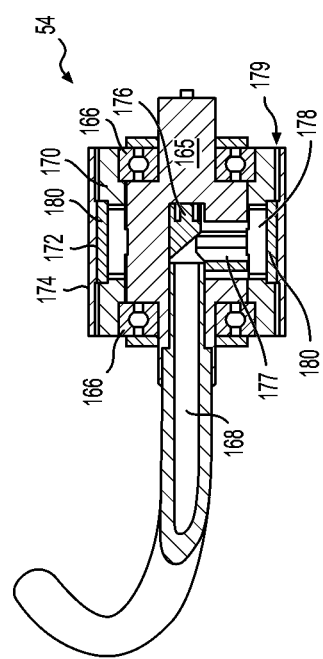

FIGS. 22, 23, and 24 illustrate various views of an exemplary module 54. As shown in these figures, module 54 may be a self-contained assembly of multiple components that interact to selectively compact and/or at least partially cure matrix-wetted reinforcements during discharge from head 16. These components may include, among other things, a hollow shaft 165 that is rotationally mounted to plate 36 of sled 24 between spaced-apart bearings 166, a source 168 configured to direct energy (e.g., light) into shaft 165, a distributor 170 positioned around shaft 165, and one or more covers (e.g., a compliant inner cover 172 and/or a protective outer cover 174) mounted over distributor 170. The energy directed axially into the hollow interior of shaft 165 may be disbursed, focused, and/or redirected radially outward by an optic (e.g., a baffle, a lens, a mirror, a polished surface, etc.—shown only in FIG. 24) 176 located at an internal end of shaft 165 and one or more radial passages 177 that intersect with the hollow interior of shaft 165. The energy may pass through one or more axially extending circumferential slots 178 of distributor 170 and then through the associated cover(s), which may be at least partially transparent (e.g., about 70-99% transparent) to the energy (e.g., to light energy at about 350-450 nm wavelength, such as a wavelength of about 405 nm). In some embodiments, slots 178 may each be fitted with a transparent spacer 180 that helps to support the cover(s). In some embodiments, spacer 180 may be an optic that functions to further focus, amplify, disburse, and/or aim the energy.

As shown in FIGS. 6-9, module 54 may extend further than other modules from head 16 at a discharge end. In other words, module 54 (e.g., the outer surface of cover 174) may form the tip or TCP of head 16. In the disclosed embodiments, head 16 may be nozzle-less. Accordingly, the TCP of head 16 may correspond with an axially oriented line of contact between the outer surface of cover 174 and an active surface (e.g., where module 54 pushes the wetted-reinforcement onto the surface) of structure 12. The TCP may also correspond with a vector of maximum force passing from head 16 through module 54 to the reinforcement being pressed onto a surface of structure 12. It should be noted that the TCP may shift, for example as head 16 is tilted by support 14 (referring to FIG. 1) relative to the print surface and/or relative to a travel direction (e.g., when printing into free space).

During material discharge from head 16, feed roller 138 of module 52 may periodically engage outer cover 174 of module 54. This engagement during reinforcement feeding may allow feed roller 138 to transfer rotational motion (e.g., in a counter direction) to outer cover 174, any associated inner cover(s) 172, and distributor 170. With the reinforcement being sandwiched between feed roller 138 and outer cover 174, the counter rotations of these components may cause the reinforcement to be pushed out of head 16.

In one embodiment, feed roller 138 and outer cover 174 of module 54 may have different surface characteristics that help to feed the reinforcement through head 16 and inhibit undesired sticking of the reinforcement. For example, outer cover 174 may be smoother and/or made with a material that is different than the outer surface of feed roller 138. In one embodiment, the outer cover may be fabricated from a low-friction material (e.g., Polytetrafluoroethylene—PTFE, Fluorinated ethylene propylene—FEP, etc.), while the outer surface of feed roller 138 may be fabricated from a higher-friction material (e.g., aluminum). In one example, FEP may be utilized for the outer cover 174, due to its greater transparency when compared with PTFE. The outer surface of feed roller 138 may be roughed (e.g., bead blasted) to further increase its friction, if desired.

Inner cover 172 may have a hardness of about 20-50 A-Shore (e.g., about 40 A-Shore), and outer cover 174 may have a greater hardness to increase longevity during cutting. The resulting compliance of inner cover 172 may allow for adequate engagement and compressive forces on the reinforcement, without requiring great accuracy in the positioning of modules 52 and 54. The compliance of inner cover 172 may also result in a flat spot 179 at an area of engagement with structure 12 (referring to FIG. 1). Flat spot 179 may help the matrix-wetted reinforcement disengage from module 54 and adhere to only structure 12, and also help the reinforcement to lay flat against an underlying layer of structure 12. In addition, the compliance of inner cover 172 may allow cutting device 154 to push a distance into module 54, thereby improving a severing performance of module 52. Outer cover 174 may need to be periodically replaced due to its engagement with cutting device 154. A thickness of outer cover 174 may be less than a thickness of inner cover 172, such that the compliance of inner cover 172 may still be effective through the harder outer cover 174. For example, inner cover 172 may be about 5-25 times a thickness of outer cover 174.

Because energy may be directed through module 54 to the matrix-wetted reinforcement, curing at (e.g., just before, directly over, and/or just after) the TCP may be possible. It is contemplated that enough curing may take place to tack the reinforcement before little, if any, movement of the reinforcement away from the TCP location has occurred. This may improve placement accuracy of the reinforcement.

It is also contemplated that the matrix may be cured only at an outer surface (e.g., enough to tack and/or maintain a desired shape) or that the matrix may be through-cured via exposure to only the energy from source 168 (in addition to or without any extraneous environmental exposure). In some applications, however, additional energy exposure (e.g., oven baking, autoclave heating, etc.) after completion of structure 12 may be required.

In one embodiment, geometry of distributor 170 is selected to focus the energy from source 168 at the TCP. For example, the geometry may allow energy from source 168 to pass through only the slot 178 angularly aligned with the TCP, while inhibiting energy from passing through the other slots 178. A thicker walled distributor 170 having narrower slots 178 may have an even more focused exposure area. In the disclosed example, slot 178 may have an axial length of about 0-2 times a width of the reinforcement passing over distributor 170.

As shown in FIGS. 25, 26 and 27, the above-described functionality of module 54 may be distributed among multiple sequentially trailing components or devices, if desired. For example, a first roller 400 may be situated to be directly engaged by the discharging reinforcement and to press the reinforcement against an underlying surface. A second roller 402 may trail behind first roller 400 and function to hold down the reinforcement during curing by a trailing energy source 404.

First roller 400 may be biased in a direction normal to the underlying surface via a spring 406. Like module 54 of FIGS. 22 and 23, first roller 400 of FIGS. 25-27 may include shaft 165, bearings 166, inner cover 172, and outer cover 174. However, in contrast to module 54, first roller 400 may not include distributor 170 or be connected to source 168. In addition, shaft 165 may or may not be hollow and may not include optic 176 or passage 177. That is, first roller 400 may not have any curing functionality.

Second roller 402 may trail a distance behind first roller 400, have a smaller diameter (e.g., ¼-½ the diameter of first roller 402), and be configured with curing functionality. In a first embodiment, second roller 402 may ride on a shaft (e.g., a shaft similar to shaft 165) 408 that incorporates optics 176 and/or passage 177, such that energy from source 168 passes radially outward through an at least partially transparent surface of second roller 402 to the underlying reinforcement. In a second embodiment, energy from trailing energy source 404 may be directed radially into and out of (e.g., completely through) second roller 402 to a nip point thereof (e.g., in addition to or instead of the light emanating from passage 177). It is contemplated, however, that trailing energy source 404 could be directed to impinge the reinforcement at a location behind second roller 402, if desired. Any combination of these cure enhancing energy arrangements may be possible. Energy source 404 may include, for example, a UV light and any number of optical tubes that extend from the light to the desired cure location(s). Second roller 402 may not require one or both of covers 172 or 174, as cutting may not be performed against second roller 402.

It should be noted that, in some embodiments, energy from trailing cure source 404 and/or internal cure source 168 may be inhibited from passing forward toward first roller 400. For example, a light shield 409 may be placed at a leading side of second roller 402 to block the energy. This blocking of energy may reduce a likelihood of matrix curing prior to contact with second roller 400 and thereby improve reinforcement placement accuracy, interlaminar shear strength, and component longevity.

In the disclosed embodiment, second roller 402 and trailing cure source 404 may be mounted to a common bracket 411, such that their relative positions are fixed. Bracket 411 may be configured to move relative to the rest of sled 24 by sliding along a bearing rail 413. Bracket 411, along with second roller 402 and trailing cure source 404 may be biased towards the underlying material (e.g., via a spring 415).

Yet additional alternatives to module 54 may be shown in FIGS. 28, 29, and 30. For example, as shown in FIGS. 28 and 29, second roller 402 may be replaced with a shoe 410. Shoe 410 may be fabricated from a compliant material (e.g., from a spongy foam) and configured to exert a compressing force against the wetted reinforcement already pressed down onto the underlying surface by roller 400. Shoe 410 may or may not be biased toward the reinforcement, and energy source 404 may be aimed toward the reinforcement at a location behind shoe 410. In this embodiment, shoe 410 may function as the shield to block energy from source 404 from reaching upstream locations (e.g., first roller 400). In applications where shoe 410 is biased toward the reinforcement, the bias of shoe 410 may be less than a bias of first roller 400. This tiered biasing may result in increasing pressure being applied to the reinforcement along its trajectory, with a lower likelihood of undesirable wandering of and/or matrix wringing out of the reinforcement. As shown in the embodiment of FIG. 30, the sequence of roller 400 and shoe 410 may be reversed relative to the travel direction of head 16.

A guide 412 may be positioned in the embodiment of FIGS. 29-30 to direct the reinforcement to the nip point (e.g., to a tangent of the outer surface) of first roller 400 or shoe 410, depending on the embodiment, at an oblique angle relative to a vertical axis (e.g., the sliding axis of sled 24—referring to FIG. 2 and/or the compaction axis of roller 400) and/or relative to a travel direction of head 16 (e.g., when the travel direction is orthogonal to the vertical axis). This orientation may help to further inhibit walking of the reinforcement away from a desired location, since the location of the reinforcement may not be permanently fixed until exposed to energy from source 404. In one embodiment, guide 412 may function as the nozzle of device 130 (e.g., device 130 may be located in the position shown in FIGS. 29-30).

As shown in FIG. 29, source 404 may include multiple (e.g., three trailing optical tubes) that direct cure energy directly down in the vertical direction toward the reinforcement, as well as to the transverse sides of the reinforcement. As shown in FIG. 30, one or more optical tubes may additionally be located to pass energy through roller 400.

It is contemplated that, in addition to being tilted side-to-side, any of the optical tubes could additionally be tilted in the fore-aft or traveling direction head 16. For example, FIG. 30 illustrates tilting of the optical tubes in the forward direction, such that the energy impinges at a location only downstream of first roller 400. This may help ensure that matrix does not cure and build up on roller 400. However, tilting the optical tubes in the opposite direction (e.g., as shown in FIG. 25) may result in curing closer to the nip point or TCP of roller 400 and thereby increase placement accuracy of the reinforcement. Side-to-side tilting of the optical tubes may range from the vertical direction to horizontal, with curing improving as the angle increases (although at a detriment of form factor). Tilting in the forward direction may be limited to an angle that inhibits upstream curing while keeping the cure location as close to the nip point as possible. Tilting in the rearward direction may be limited only by formfactor.

INDUSTRIAL APPLICABILITY

The disclosed system and print head may be used to manufacture composite structures having any desired cross-sectional size, shape, length, density, and/or strength. The composite structures may include any number of different reinforcements of the same or different types, diameters, shapes, configurations, and consists, each coated with a common matrix. Operation of system 10 will now be described in detail with reference to FIGS. 1-30.

At a start of a manufacturing event, information regarding a desired structure 12 may be loaded into system 10 (e.g., into controller 20 that is responsible for regulating operations of support 14 and/or head 16). This information may include, among other things, a size (e.g., diameter, wall thickness, length, etc.), a shape, a contour (e.g., a trajectory), surface features (e.g., ridge size, location, thickness, length; flange size, location, thickness, length; etc.) and finishes, connection geometry (e.g., locations and sizes of couplers, tees, splices, etc.), location-specific matrix stipulations, location-specific reinforcement stipulations, compaction requirements, curing requirements, etc. It should be noted that this information may alternatively or additionally be loaded into system 10 at different times and/or continuously during the manufacturing event, if desired.

Based on the component information, one or more different reinforcements and/or matrixes may be selectively loaded into head 16. For example, supply 60 may be loaded onto creel 19 (referring to FIG. 10), and reservoir 78 may be filled with matrix (referring to FIG. 12). The reinforcements may then be threaded through head 16 prior to start of the manufacturing event. Threading may include passing the reinforcement from supply 60 around redirect 72 and idler 66 (referring to FIG. 10), and then through the opening of anvil 74 and under shoe 75 (referring to FIG. 11). The reinforcement may then pass through wetting mechanism 84 (e.g., over surface 104—referring to FIG. 12), 114 (around surface(s) 116 and/or 118) and/or 130 (e.g., through the nozzle). The reinforcement may then pass between feed roller 138 of module 52 and the outer cover 174 of module 54.

Some or all of this threading may be accomplished manually or automatically. For example, the reinforcement may be passed between modules 52 and 54 at a time when feed roller 138 is pivoted away from module 54 by actuator 144 (referring to FIGS. 16-17). In another example, feed roller 138 may be driven by actuator 140 to pull reinforcement through the other components at a time when feed roller 138 is engaged with module 54 by actuator 144. After threading is complete, head 16 may be ready to discharge matrix-coated reinforcements.

Once head 16 has been loaded with material (e.g., the reinforcement(s) and matrix), a startup sequence may be initiated. This may include, for example, homing of feed roller 138 based on input received from sensor 160/162. For example, feed roller 138 may be rotated by actuator 140 to an angle at which the outer surface of feed roller 138 at a location downstream of cutting device 154 and the reinforcement is in the airflow path of orifices 150. Feed roller 138 may then be moved by actuator 144 towards module 54 to pinch the reinforcement therebetween, and a flow of air (or another medium) radially outward through orifices 150 may be initiated.

Module 54 may then be activated to direct cure energy radially outward through slots 178. It should be noted that by homing feed roller 138 prior to activation of module 54, cutting device 154 may be oriented away from module 54 and shielded from the cure energy. This may inhibit curing and build up of matrix on cutting device 154. While module 54 is active, actuator 140 may be energized to rotate feed roller 138 and feed the loose end of reinforcement around module 54 (e.g., from a cutting location to or past the TCP and nip point of module 54). Feed roller 138 may then be retracted away from module 54 via rotation of actuator 144, and the flow of air through orifices 150 may be stopped. Feed roller 138 may then be rotated back towards its starting position, such that cutting device 154 is again shielded from the cure energy. Thereafter, head 16 may be moved in any trajectory to pull matrix-wetted reinforcements from head 16 onto existing surfaces and/or into free space to form structure 12.

During discharge of the wetted reinforcements from head 16, module 54 may roll over the reinforcements. A pressure applied by the outer surface of cover 174 may press the reinforcements against an adjacent (e.g., underlying) layer of structure 12, thereby compacting the material. Source 168 may remain active during material discharge from head 16 and during compacting, such that at least an outer portion of the material is cured and hardened enough to remain tacked to the underlying layer and/or to maintain its discharged shape and location. In some embodiments, a majority (e.g., all) of the matrix may be cured by the exposure to energy from source 168.

It should be noted that the amount of cure energy generated by module 54 may be variable. For example, the energy could be generated at levels that are related to other parameters (e.g., travel speed) of head 16. For instance, as the travel speed of head 16 increases and the discharge rate of reinforcement from head 16 proportionally increases, the amount of energy generated by module 54 and directed toward the discharging material may likewise be increased. This may allow a consistent unit of energy to be received by the matrix coating the reinforcement under a range of conditions. It is also possible that a greater unit of energy may be received during particular conditions (e.g., during anchoring, during free-space printing, at particular geometric locations of structure 12, etc.), if desired.

The component information may be used to control operation of system 10. For example, the reinforcements may be discharged from head 16 (along with the matrix), while support 14 selectively moves head 16 in a desired manner during curing, such that an axis of the resulting structure 12 follows a desired trajectory (e.g., a free-space, unsupported, 3-D trajectory). In addition, module 48 may be carefully regulated by controller 20 such that the reinforcement is wetted with a precise and desired amount of the matrix. For example, based on signals generated by encoder 73 that are indicative of a feed rate of the reinforcement through head 16, controller 20 may selectively increase or decrease a speed of actuator(s) 102 to provide a corresponding feed rate of matrix to wetting mechanism 84. In this way, regardless of the travel speed of head 16, a desired ratio of matrix-to-reinforcement may always be maintained.

As discussed above, during payout of matrix-wetted reinforcement from head 16, subassembly 64 may function to maintain a desired level of tension within the reinforcement. It should be noted that the level of tension could be variable, in some applications. For example, the tension level could be lower during anchoring and/or shortly thereafter to inhibit pulling of the reinforcement during a time when adhesion may be lower. The tension level could be reduced in preparation for severing and/or during a time between material discharge. Higher levels of tension may be desirable during free-space printing to increase stability in the discharging material. Other reasons for varying the tension levels are also contemplated. The level of tension may be adjusted via threshold adjustments associated with when actuator 62 is turned on/off and/or what speeds and/or torques are applied by actuator 62 in response to signals from sensor 70.

After a period of material discharging, it may become necessary to sever the reinforcements (e.g., to complete the manufacturing event and/or to move head 16 to another area of structure 12 for restart of a new track of discharging material). At this point in time, actuator 140 (referring to FIGS. 16 and 17) may be selectively activated (e.g., by controller 20—referring to FIG. 1) to index cutting device 154 (referring to FIGS. 19-21) to an appropriate position oriented towards module 54. Thereafter, actuator 140 may be activated to pivot feed roller 138 and cutting device 154 toward module 54, thereby severing the reinforcement located therebetween. In some applications, module 46 may be selectively activated to clamp the reinforcement prior to severing, such that severing does not result in reverse movement of the reinforcement through head 16 (e.g., caused by tension within the reinforcement). Module 46 may remain engaged until the loose end of the severed reinforcement is fed back to the TCP in preparation for the next discharging event. It should be noted that the pivoting of feed roller 138 and cutting device 15*d* module 54 may be synchronized with motion and other operations of head 16, such that severing of the reinforcement can be completed on the fly while maintaining placement accuracy of the reinforcement.

In one embodiment, cutting device 154 may be oriented during severing to selectively increase or decrease a length of the remaining tag end. For example, rather than orienting cutting device 154 radially through a center of module 54 (i.e., through an axis of distributor 170), cutting device 154 may be clocked forward or backwards to a location between the center of module 54 and a tangent to outer cover 174. Clocking cutting device 154 further forward relative to the rotational direction of module 54 may result in a longer tag end. Conversely, clocking cutting device 154 in reverse direction may result in a shorter tag end.

To thereafter restart discharging of a new track of material, support 14 (under the regulation of controller 20) may move head 16 to the new start area. Feed roller 138 may be retracted via activation of actuator 144 and module 54 may be caused to roll over the tag-end, thereby starting discharge of the new track.

It will be apparent to those skilled in the art that various modifications and variations can be made to the disclosed system and head. Other embodiments will be apparent to those skilled in the art from consideration of the specification and practice of the disclosed system and head. It is intended that the specification and examples be considered as exemplary only, with a true scope being indicated by the following claims and their equivalents.

What is claimed is:

1. An additive manufacturing system for fabricating a three-dimensional composite structure, comprising:
   a support;
   a print head operatively connected to the support, wherein the support is capable of moving the print head in multiple directions during the fabrication of the three-dimensional composite structure, the print head including:
a housing;
a supply module operatively mounted to the housing and configured to hold a supply of a continuous reinforcement;
an impregnation module operatively mounted to the housing and configured to wet the continuous reinforcement with a matrix; and
a clamping module operatively mounted to the housing downstream of the supply module relative to movement of the continuous reinforcement through the print head, the clamping module configured to selectively clamp the continuous reinforcement;
a controller in communication with the support and the print head and configured to coordinate operations of the support and the print head to fabricate the three-dimensional composite structure by moving the print head in at least one of the multiple directions during the fabrication;
a compacting module operatively mounted to the housing and/or a curing module operatively mounted to the housing, wherein the compacting module is configured to move relative to the housing and/or the curing module is configured to move relative to the housing; and
a cutting module configured to cut the continuous reinforcement, and wherein:
the cutting module is configured to move together with the compacting module relative to the housing, and/or
the cutting module and the compacting module are configured to move together with the curing module relative to the housing.

2. The additive manufacturing system of claim 1, wherein the clamping module is configured to ensure unidirectional movement of the reinforcement through print head by inhibiting only retraction of the continuous reinforcement into the print head.

3. The additive manufacturing system of claim 1, wherein the clamping module is located upstream of the impregnation module.

4. The additive manufacturing system of claim 3, further including a tensioning subassembly located upstream of the clamping module.

5. The additive manufacturing system of claim 1, further including a tensioning subassembly configured to generate a signal indicative of tension within the continuous reinforcement, wherein the controller is configured to regulate operation of the supply module based on the signal.

6. The additive manufacturing system of claim 1, wherein the impregnation module is configured to direct the matrix to wet the continuous reinforcement in an amount greater than an amount desired to be discharged from the print head with the continuous reinforcement.

7. The additive manufacturing system of claim 6, wherein the impregnation module includes a nozzle configured to restrict passage of the matrix in excess of the desired amount.

8. The additive manufacturing system of claim 6, wherein the impregnation module is configured to generate a pressure differential in the matrix across the continuous reinforcement.

9. The additive manufacturing system of claim 1, further including at least one of a cutting module and a feeding module operatively mounted to the housing.

10. The additive manufacturing system of claim 9, wherein the at least one of the cutting module and the feeding module is mounted downstream of the impregnation module.

11. The additive manufacturing system of claim 10, wherein the at least one of the cutting module and the feeding module is a single module configured to both cut the continuous reinforcement and feed the continuous reinforcement through the print head.

12. The additive manufacturing system of claim 1, further including the compacting module and the curing module, wherein the compacting module and the curing module are a single module configured to compact the continuous reinforcement and cure the matrix.

13. The additive manufacturing system of claim 1, further including the compacting module and the curing module; and wherein:
one of the compacting module or the curing module is a leading device configured to pass over and compress the continuous reinforcements; and
the other of the compacting module or the curing module is a trailing device configured to pass over and compress the continuous reinforcement.

14. The additive manufacturing system of claim 13, wherein the the curing module further includes at least one source configured to direct cure energy either through the leading device and toward the matrix wetting the continuous reinforcement or behind the leading device and toward the matrix wetting the continuous reinforcement.

15. The additive manufacturing system of claim 14, wherein the at least one source includes multiple sources configured to direct cure energy both through and behind the leading device.

16. An additive manufacturing system for fabricating a three-dimensional composite structure, comprising:
a support;
a print head operatively connected to the support, wherein the support is capable of moving the printhead in multiple directions during the fabrication of the three-dimensional composite structure,
the print head is configured to wet a continuous reinforcement with a matrix and discharge the wetted continuous reinforcement, wherein the print head includes a housing;
a controller in communication with the support and the print head and configured to coordinate operations of the support and the print head to fabricate the three-dimensional composite structure by moving the print head in at least one of the multiple directions during the fabrication; and
a compacting module operatively mounted to the housing and/or a curing module operatively mounted to the housing, wherein the compacting module is configured to move relative to the housing and/or the curing module is configured to move relative to the housing; and
further including a cutting module configured to cut the continuous reinforcement, and wherein:
the cutting module is configured to move together with the compacting module relative to the housing, and/or
the cutting module and the compacting module are configured to move together with the curing module relative to the housing.

* * * * *